(12) United States Patent
Nance

(10) Patent No.: US 6,193,190 B1
(45) Date of Patent: Feb. 27, 2001

(54) AIRCRAFT VERTICAL LANDING GUIDANCE METHOD AND SYSTEM

(76) Inventor: C. Kirk Nance, P.O. Box 120605, Arlington, TX (US) 76012

(*) Notice: Subject to any disclaimer, the term of this patent is extended or adjusted under 35 U.S.C. 154(b) by 0 days.

(21) Appl. No.: 09/226,951

(22) Filed: Jan. 8, 1999

(51) Int. Cl.$^7$ ........................................... B64F 1/20
(52) U.S. Cl. ........................... 244/114 R; 340/953
(58) Field of Search ........................... 244/17.17, 114 R, 244/183; 340/946, 953, 954, 955

(56) References Cited

U.S. PATENT DOCUMENTS

| | | | |
|---|---|---|---|
| 2,023,708 | * 12/1935 | Spring | 340/955 X |
| 2,206,036 | * 7/1940 | Herson | 340/953 X |
| 2,497,427 | * 2/1950 | Weiss | 244/114 R X |
| 3,843,263 | * 10/1974 | Snead | 244/114 R X |
| 4,196,346 | * 4/1980 | McElhannon | 340/953 X |
| 4,700,912 | * 10/1987 | Corbett | 244/114 R X |

* cited by examiner

Primary Examiner—Robert P. Swiatek
(74) Attorney, Agent, or Firm—Geoffrey A. Mantooth

(57) ABSTRACT

A vertical lift aircraft, such as a helicopter, can land in an area with impaired visibility such as fog. Around the landing area is a plurality of laser beam emitters. The emitters project a pattern of laser beams skyward. The helicopter finds the general area by spot-lights pointing up through the fog, or by navigation. As the helicopter approaches, it sends a radio signal, which is detected on the ground. The spot-lights are switched off and the laser emitters are switched on. The helicopter is positioned within the pattern so that the laser beams reflect off of a portion of the aircraft, such as the rotor blades. This forms a visual cue, which the pilot uses to maintain the position of the helicopter relative to the landing area and descends thereto.

19 Claims, 4 Drawing Sheets

AIRCRAFT VERTICAL LANDING GUIDANCE METHOD AND SYSTEM

BACKGROUND OF THE INVENTION

The weather condition known as fog causes a severe reduction in the visibility for pilots operating aircraft. Fog often restricts a pilot from flying a helicopter due to a reduced visibility and the potential inability for the pilot to identify a suitable location to land the helicopter. Fog does not restrict the mechanical operation of a helicopter, but rather the operational considerations of determining where the pilot can land the helicopter without crashing into adjacent trees or structures. The present invention incorporates laser beams to aid in the identification of an unobstructed landing site for a helicopter. The laser beam is normally invisible to the human eye unless suspended particles are present in the air, for the laser beam to reflect from. Fog, which can form above ground, is composed of suspended particles of moisture in the air. Fog makes visible the previously invisible laser beams, which are used to identify an unobstructed landing site. This lighting feature aids pilots in determining the location of an unobstructed landing, which had become obscured in the fog.

SUMMARY OF THE INVENTION

It is an object of the present invention to provide a suitable, unobstructed landing site identification lighting system that is more effective than existing landing pad lighting systems.

The present invention provides a method of guiding a vertical lift aircraft to a landing zone. A pattern of focused light beams is projected from the landing zone skyward. Skyward of the landing zone, the aircraft is positioned within the pattern. Part of the aircraft is illuminated with the pattern so as to form a visual cue as to the position of the aircraft relative to the landing zone.

In one aspect of the present invention, the focused light beams can be either beams of coherent or incoherent light. The focused light beams can comprise beams of visible light or invisible light, wherein the invisible light becomes visible when it strikes an object.

In another aspect of the invention, the landing zone has a predetermined shape and the pattern of the focused light beams has a shape that corresponds to the landing zone shape. In particular, the pattern of focused light beams can form a cylinder as it is projected skyward.

In another aspect of the present invention, the pattern of focused light beams can project vertically from the landing zone or at an angle to the vertical.

In still another aspect of the present invention, the aircraft is descended to the landing zone using the visual cue.

In still another aspect of the present invention, the aircraft comprises a helicopter having rotor blades. Parts of the rotor blades are illuminated with the pattern, wherein the visual cue appears on the rotor blades, readily visible to a pilot of the helicopter.

In still another aspect of the present invention, the approach of the aircraft to a position above the landing zone is detected. When detected, the pattern of focused light beams is then projected from the landing zone skyward. Detecting the approach of the aircraft can be accomplished by receiving a radio transmission from the aircraft.

In accordance with still another aspect of the present invention, spotlights are provided at the landing zone before the step of projecting the pattern of focused light beams so as to direct the helicopter to the general area of the landing zone. Alternatively, diverging laser beams are used to direct the helicopter to the general area of the landing zone.

In accordance with another aspect of the present invention, the light beams comprise a first color. A second color of light, being a different color than the light forming the cylinder is projected into a crossing pattern of focused light beams at a first altitude. A third color of light being a different color than the light forming the cylinder is projected into a crossing pattern of focused light beams at a second altitude. Thus, as the helicopter descends to the landing zone in the cylinder pattern of light, visual cues as to the altitude of the aircraft relative to the landing zone are provided by the different colors of crossing light.

The present invention also provides a system of guiding a vertical lift aircraft to a landing zone. The system includes an unobstructed area. A plurality of laser beam emitters are deployed in the area, with the emitters being arranged so as to project a pattern of light beams skyward.

In accordance with one aspect of the present invention, the system also includes a controller connected to the emitters. The controller includes a detector that detects the approach of the aircraft to the landing zone. The controller also includes a switch for operating the emitters upon the detection of the approach of the aircraft.

In accordance with another aspect of the invention, the emitters are first emitters and the light beams comprise a first color. The system also includes second and third emitters. The second emitters project a second color of light into a crossing pattern of light beams at a first altitude above the landing zone, while the third emitter project a third color of light into a crossing pattern of light beams at a second altitude.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
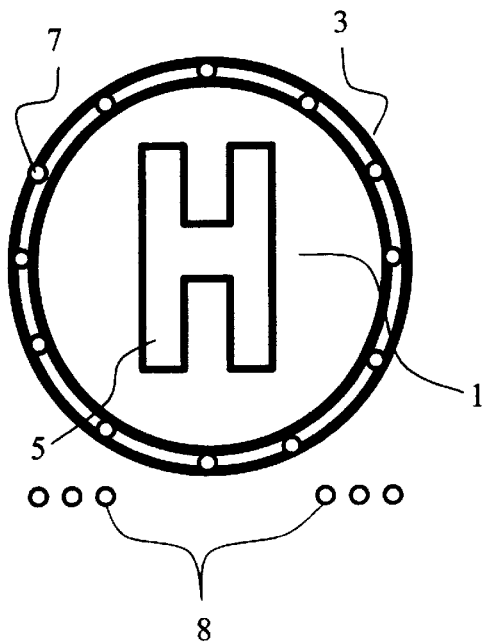
FIG. 1 is an overhead view of a helicopter landing pad of the present invention, in accordance with a preferred embodiment.

In the drawings, like reference numerals designate corresponding parts throughout the several views. The present invention provides a method of indicating the location of a suitable landing site or zone, in conditions of fog. The landing site comprises an area that is unobstructed and arranged to allow for the landing of a helicopter. Upon arrival to an area obscured by fog, above which the helicopter 11 wishes to land, multiple laser beams 9 are produced around the perimeter of the circular shaped landing pad 1. These multiple laser beams generate a circular column of light 10 projecting vertically into the fog-filled sky. The helicopter pilot then transitions the helicopter inside the circular column of laser beams and descends the helicopter safely down within the column of laser beams, to the unobstructed landing pad 1.

In FIG. 1, there is shown a helicopter landing pad 1 consisting of a circle 3 around the landing pad 1, with an H 5 located in the center of landing pad 1. Multiple laser emitters 7, which generate vertical light beams 9 (FIG. 2), are spaced an equal distance around landing pad circle 3.

Each laser emitter 7 generates a beam 9 of laser light. The diameter of the individual laser beams 9 should be several inches so as to be readily visible. The laser emitters 7 are conventional, commercially available devices. The laser emitters 7 produce a tightly focused beam of coherent light that has excellent fog penetrating capabilities. Typically, fog is close to the ground and is not very deep. The laser beams produced by the emitters have sufficient power to produce a beam of such intensity that will penetrate to the top of the fog layer.

The laser emitters can produce a visible beam or an invisible beam. If an invisible beam is used, it is of a wavelength that produces a visible spot on an illuminated object. For example, there are lasers that produce beams of light that are ordinarily invisible in clear air; however, in fog, the beams of light become visible as they reflect off the fog particles.

The laser emitters 7 are positioned in a circular pattern around the landing pad circle 3, so that the beams of light project skyward. The diameter of the circle 3 is less than the diameter of the helicopter rotor blades 13.

Figure 6:
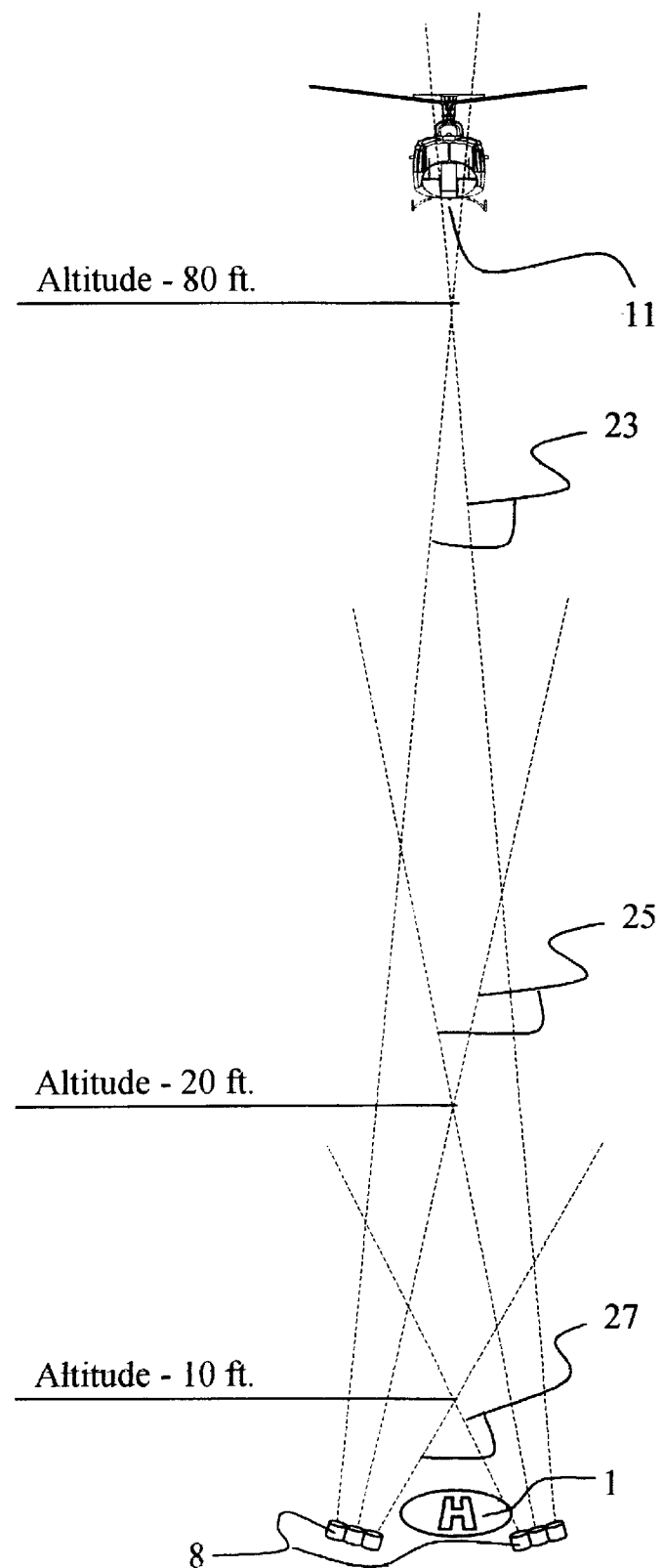
FIG. 6 is a schematic alternate view on the invention illustrating crossing light beams of plural colors.

Auxiliary lights 8, which generate crossing laser light beams, are placed outside of landing pad circle 3 and will be more fully described in FIG. 6 which follows. In addition, lights 8 can provide spot light.

Figure 2:
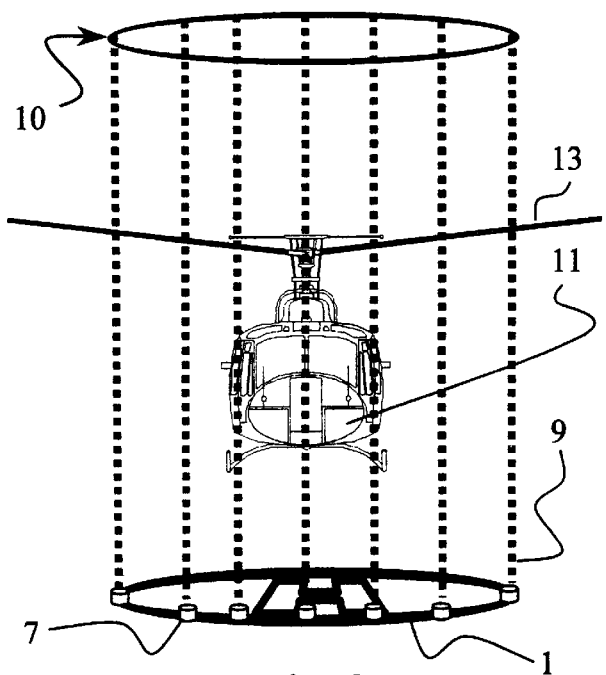
FIG. 2 is a schematic front view of the helicopter landing pad with illuminated light beams and hovering helicopter.
Figure 3:
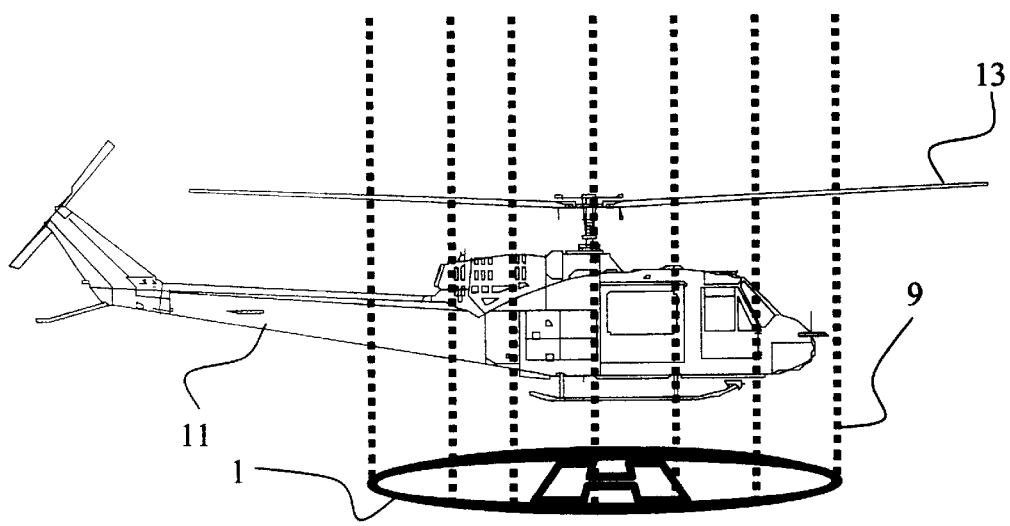
FIG. 3 is a schematic side view of the helicopter landing pad with illuminated light beams and hovering helicopter.

Referring now to FIGS. 2 and 3, there is shown a front and side view of a typical helicopter landing pad 1 with illuminated vertical light beams 9 and hovering helicopter 11. Helicopter 11 has rotor blades 13. As helicopter 11 hovers over the circle shaped landing pad 1, rotor blades 13 pass through the circle of vertical light beams 9. The pilot within helicopter 11 can look upwards seeing rotor blades 13 pass through vertical light beams 9. The laser beams 9 illuminate portions of the spinning rotor blades. The illuminated portions are visible to the pilot, who positions the helicopter 11 within the circle of light beams 9 as the helicopter 11 descends toward landing pad 1.

Tightly focused spot-lights 8 (see FIG. 4) are used to aid the helicopter pilot in determining the general area at which the unobstructed landing site is located. Once the general area is located the invention receives a radio signal from the approaching helicopter to turn off the focused spot-light beams and immediately turn on the laser beams. Though the focused spot-light beams work well in guiding the pilot to the general location of the unobstructed landing site, these focused spot-light beams tend to scatter ambient light throughout the general area illuminating a vast amount of the suspended moisture particles which make-up the fog and create a hindering obscurity to the pilot's visibility, while the pilot is trying to locate the exact landing site for the helicopter. The lasers however contain the projected light in a very narrow beam, eliminating the obscurity caused by the scattering light of the spot-light beams which tend to cloud the vision of a pilot in fog.

Figure 4:
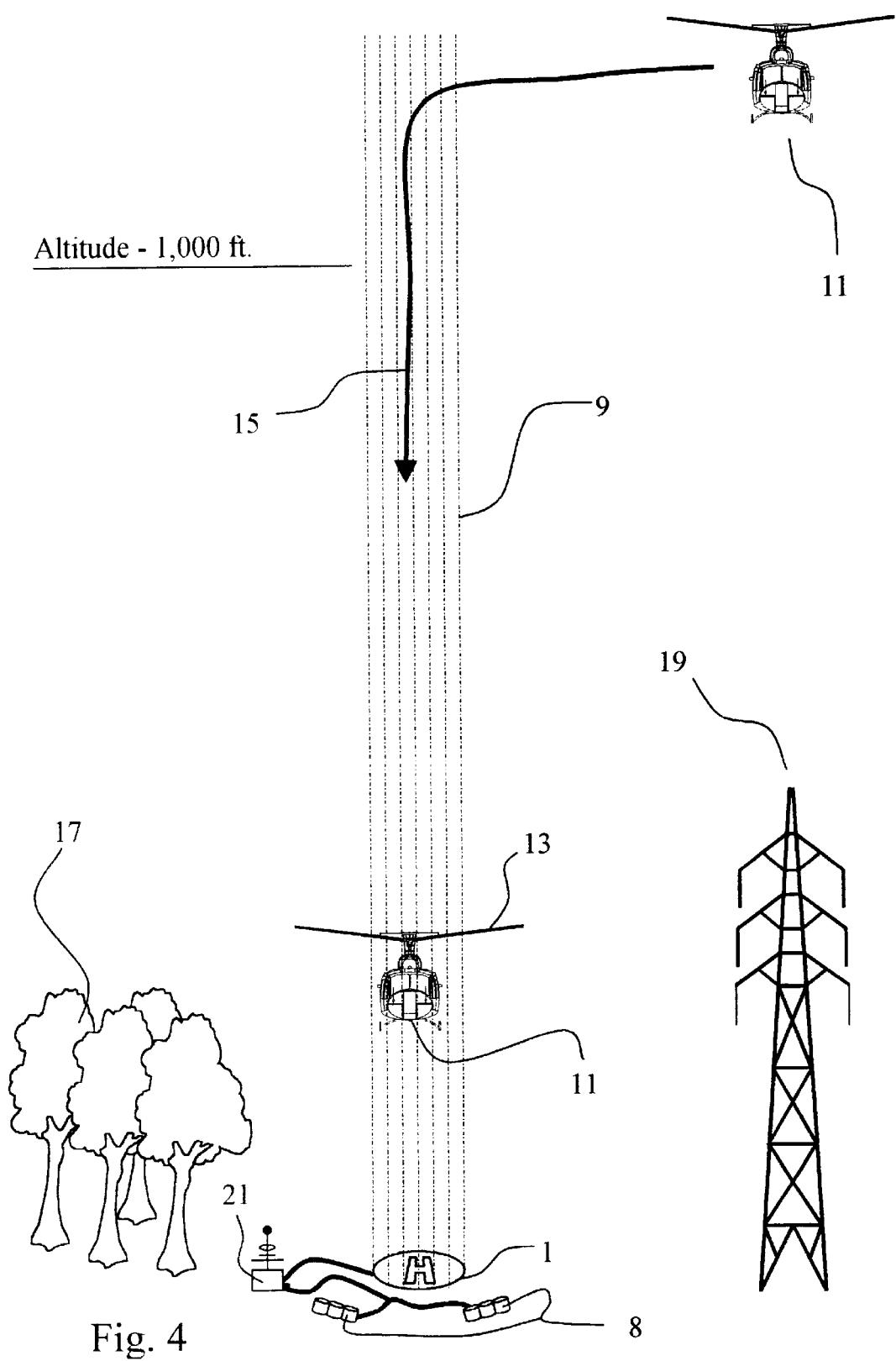
FIG. 4 is a schematic view on the invention in its preferred embodiment illustrating the light beams as extending straight up.

Referring now to FIG. 4, is a view of the invention in its preferred embodiment where helicopter 11, approaching landing pad 1 which is obscured by fog, can hover at a high altitude, above obstructions such as trees 17 or tall electrical line towers 19. Helicopter 11 is normally equipped with a radio with the ability to transmit radio signals on various frequencies. The helicopter radio can transmit a signal on a prescribed radio frequency to be received by radio receiver 21, which is located adjacent to, and connected to switch on and off laser emitters 7. Upon detection of the prescribed radio signal from helicopter 11, radio receiver 21 will switch on the laser emitters 7, which produce vertical light beams 9. Upon visual detection of vertical light beams 9 reaching far into the fog filled skies above landing pad 1, the pilot of helicopter 11 can then follow a transition path 15, to position helicopter 11 inside the circle of vertical light beams 9. Once helicopter 11 is positioned inside the circle of vertical light beams 9 the pilot can land the helicopter 11, within vertical light beams 9, onto landing pad 1. While the pilot descends helicopter 11, within vertical light beams 9, the pilot can monitor the position of the helicopter 11, within vertical light beams 9, by looking upward at rotors blades 13, and seeing the reflections of vertical light beams 9 created on rotor blades 13 as they pass through vertical light beams 9. Having the helicopter pilot monitor the reflections of vertical light beams 9 avoids the danger of the pilot trying to look downward at vertical light beams 9 and having the pilot's vision impaired by the intense light shining directly into the pilot's eyes. The pilot can look out of the front and side windows to view the illuminated rotor blades. When properly positioned above the landing pad 1, a circle of light appears on the rotor blades forming a visual cue for the pilot. By positioning the helicopter so that the helicopter stays centered within the circle, the pilot properly positions the aircraft over the landing pad 1. In the event rotor blades 13 no longer reflect the light from vertical light beams 9, the pilot can assume the helicopter 11 has drifted out of the preferred descent path for landing and can then take appropriate steps to reposition helicopter 11 to a proper descent path 15, within the circle of vertical light beams 9.

Figure 5:
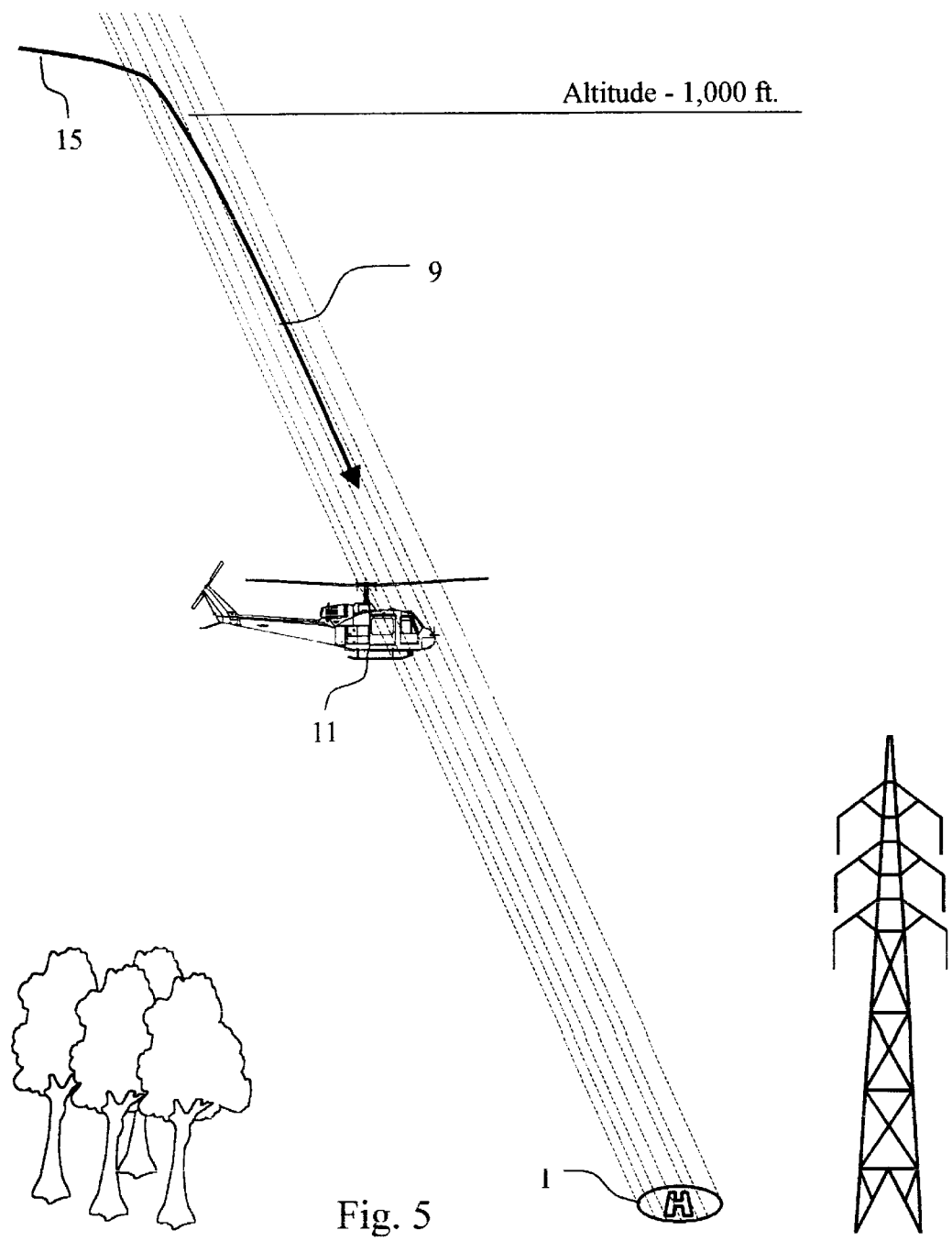
FIG. 5 is a schematic view on the invention illustrating the light beams as extending at an angle.

Referring now to FIG. 5, there is shown a view of one embodiment of the invention illustrating the light beams 9 projecting at an angle to allow for a helicopter 11 landing glide-slope. This allows the pilot to come into the landing zone at an angle. The pilot of helicopter 11 is required to descend helicopter 11 in an angled approach slope to allow helicopter 11 to descend along that same slope in an auto-rotation mode, in the event the engine of helicopter 11 were to cease operation.

Referring now to FIG. 6, there is shown a view of an alternate embodiment of the invention where auxiliary lights 8 generate crossing blue laser beams 23 which intersect at an altitude of eighty feet, crossing green laser beams 25 which intersect at an altitude of twenty feet, and crossing yellow laser beams 27 which intersect at an altitude of ten feet, are illuminated as an aid to determine various altitudes. These crossing patterns can be located outside of the cylinder of light beams 9, and within visual range of the pilot. The pilot of helicopter 11 can adjust the helicopter rate of descent as he recognizes the helicopter 11 descending through the changing altitudes identified by the appropriate laser beam color of blue, green or yellow. Once the helicopter 11 descends to the lowest yellow crossing laser beams 27 the pilot can minimize the helicopter 11 rate of descent to allow for a gentle landing. The altitude, at which the various crossing laser beams intersect, can be modified to the preference of any particular helicopter pilot.

In a practical application of the preferred embodiment of this new invention, the following tasks will be performed:
1. Return of a helicopter to the area of a landing pad obscured by fog
2. Helicopter pilot transmits radio signal to ground based landing pad receiver
3. Landing pad receiver activates landing pad light beams
4. Helicopter transitions into circular shaped column of light beams
5. Helicopter descends within circular shaped column of light beams
6. Helicopter pilot recognizes crossing laser altitude markers
7. Helicopter pilot reduces helicopter rate of descent
8. Helicopter pilot gently lands helicopter on unobstructed landing pad The individual laser beams can be operated on and off, so as to produce a sequence of laser beams flashing around the unobstructed landing site.

The laser beams can be substituted with beams of light which are made up of light generated in the visible spectrum, and are visible to the human eye without the need for fog or smoke in the air, or light generated in the infrared spectrum, visible by night-vision goggles with the ability to detect infrared light. By using this infrared light aspect of the invention, a helicopter, in a covert military operation, can land without the use of any, landing pad, lighting systems; allowing the helicopter to land in a more concealed manner. The beams can be either coherent or incoherent light.

The individual laser beams can be diverging beams. Diverging beams allow for wider area of light at higher altitudes, giving pilots a larger display or array to look for, as they attempt to locate the landing site for the helicopter.

Although the present invention has been described in conjunction with a helicopter, it can be used with other types of aircraft that are capable of vertical landings. For example, there are Vertical Takeoff and Landing (VTOL) aircraft, as well as Tilt Wing and Tilt Rotor Aircraft.

The pattern of light that is projected skyward need not be circular. It can be some other shape.

As an alternative to using spotlights to guide the helicopter to the general area of the landing area, the pilot can used navigational tools such as Global Positioning System (GPS).

Although the invention has been described as using laser beams that are visible in fog-filled air, the laser generators could be adapted to project light beams, which are visible in clear air.

Although an exemplary embodiment of the invention has been disclosed and discussed, it will be understood that other applications of the invention are possible and that the embodiment disclosed may be subject to various changes, modifications, and substitutions without necessarily departing from the spirit of the invention.

What is claimed is:

1. A method of guiding a rotary wing aircraft to a landing zone, comprising the steps of:
   a) projecting a pattern of focused nonintersecting discrete light beams from the landing zone skyward;
   b) skyward of the landing zone, positioning the aircraft within the pattern;
   c) illuminating simultaneously with at least a plurality of the light beams the rotary wing of the aircraft with the pattern so as to form a visual cue of the position of the aircraft relative to the landing zone.

2. The method of claim 1 wherein the focused light beams comprise beams of coherent light.

3. The method of claim 1 wherein the focused light beams comprise beams of incoherent light.

4. The method of claim 1 wherein the focused light beams comprise beams of visible light.

5. The method of claim 1 wherein the focused light beams comprise beams of invisible light, which light becomes visible when reflected off objects.

6. The method of claim 1 wherein the pattern of focused light beams projects vertically from the landing zone.

7. The method of claim 1 wherein the pattern of focused light beams projects skyward from the landing zone at an angle to vertical.

8. The method of claim 1 further comprising descending the aircraft to the landing zone using the visual cue.

9. The method of claim 1, further comprising the steps of:
   a) detecting the approach of the aircraft to a position above the landing zone;
   b) upon the detection of the approach of the aircraft, initiating the step of projecting a pattern of focused light beams from the landing zone skyward.

10. The method of claim 9 wherein the step of detecting the approach of the aircraft to a position above the landing zone further comprises the step of receiving a radio transmission from the aircraft.

11. The method of claim 1 further comprising the step of providing spot-lights at the landing zone before the step of projecting a pattern of focused light beams from the landing zone skyward so as to direct the aircraft to the general area of the landing zone.

12. The method of claim 1 wherein the light beams comprise a first color, further comprising the steps of:
   a) projecting a second color of light into a crossing pattern of focused light beams at a first altitude;
   b) projecting a third color of light into a crossing pattern of focused light beams at a second altitude.

13. The method of claim 1 wherein:
   a) the focused light beams comprise beams of coherent light;
   b) the landing zone has a predetermined shape and the pattern of focused light beams has a shape that corresponds to the landing zone shape.

14. The method of claim 1 wherein the focused light beams comprise beams of light in the infrared spectrum.

15. A method of guiding a rotary wing aircraft to a landing zone, comprising the steps of:
   a) projecting a pattern of focused light beams from a landing zone skyward, the pattern having a curved shape so as to form a visual boundary;
   b) skyward of the landing zone, positioning the aircraft within the shape;
   c) illuminating the rotary wing of the aircraft with the pattern so as to form a visual cue of the position of the aircraft relative to the landing zone;
   d) descending the aircraft while maintaining the aircraft within the shape, so as to continue to illuminate the rotary wing of the aircraft with the pattern.

16. The method of claim 15 wherein the pattern of focused light beams forms a cylinder as it is projected skyward.

17. A method of guiding a vertical lift aircraft to a landing zone, comprising the steps of:
   a) providing diverging laser beams at the landing zone so as to direct the aircraft to the general area of the landing zone;

b) projecting a pattern of focused light beams from the landing zone skyward;

c) skyward of the landing zone, positioning the aircraft within the pattern;

d) illuminating part of the aircraft with the pattern so as to form a visual cue of the position of the aircraft relative to the landing zone.

18. A system of guiding a rotary wing aircraft to a landing zone, comprising:

a) an unobstructed area;

b) a plurality of laser beam emitters deployed in the unobstructed area, the emitters being arranged so as to project a pattern of light beams skyward and onto a descending aircraft;

c) a controller connected to the emitters, the controller comprising a detector that detects the approach of the aircraft to the landing zone, the controller also comprising a switch for operating the emitters upon the detection of the approach of the aircraft;

d) spot-lights connected to the controller, the controller operating the spot-lights so as to illuminate the space around the unobstructed area until the detector detects the approach of the aircraft to the landings zone, wherein the controller turns the spot-lights off.

19. The system of claim 18 wherein the emitters are first emitters and the light beams comprise a first color, further comprising second and third emitters, the second emitter projecting a second color of light into a crossing pattern of light beams at a first altitude above the landing zone, and the third emitter projecting a third color of light into a crossing pattern of light beams at a second altitude above the landing zone.

* * * * *